US009565619B2

United States Patent
Tseng et al.

(10) Patent No.: US 9,565,619 B2
(45) Date of Patent: Feb. 7, 2017

(54) WIRELESS NETWORK (75) Inventors: Yu-Chee Tseng, Hsinchu (TW);
Shu-Hsien Lu, Yilan County (TW);
Chih-Yu Lin, Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 1198 days.

(21) Appl. No.: 12/649,344

(22) Filed: Dec. 30, 2009

(65) Prior Publication Data
US 2010/0165923 A1 Jul. 1, 2010

Related U.S. Application Data (60) Provisional application No. 61/141,246, filed on Dec. 30, 2008.

(51) Int. Cl.
*H04W 4/00* (2009.01)
*H04W 40/22* (2009.01)
*H04L 12/753* (2013.01)
*H04W 40/16* (2009.01)
*H04W 84/22* (2009.01)
*H04W 88/16* (2009.01)
*H04W 92/02* (2009.01)

(52) U.S. Cl.
CPC ............. *H04W 40/22* (2013.01); *H04L 45/48* (2013.01); *H04W 40/16* (2013.01); *H04W 84/22* (2013.01); *H04W 88/16* (2013.01); *H04W 92/02* (2013.01)

(58) Field of Classification Search
None
See application file for complete search history.

(56) References Cited

U.S. PATENT DOCUMENTS

| 2005/0153725 | A1 | 7/2005 | Naghian et al. |
| 2006/0083197 | A1* | 4/2006 | Kang ............................ 370/329 |
| 2008/0123579 | A1* | 5/2008 | Kozat et al. .................. 370/312 |
| 2008/0123680 | A1 | 5/2008 | Ko et al. |
| 2008/0279133 | A1 | 11/2008 | Bienfait et al. |

FOREIGN PATENT DOCUMENTS

CN         1832452 A         9/2006

OTHER PUBLICATIONS

Jiang Hongqi et al., "Wireless Mesh Network Extending Broadband Access", State Key Lab. on Microware and Digital Communications, Tsinghua University, Beijing 100084, p. 24-30, Jan. 31, 2005.
TW Office Action dated Oct. 25, 2012.
TW Office Action dated Mar. 22, 2013.

* cited by examiner

*Primary Examiner* — Bob Phunkulh
*Assistant Examiner* — Charles C Jiang
(74) *Attorney, Agent, or Firm* — McClure, Qualey & Rodack, LLP (57) ABSTRACT

A wireless network is provided. The wireless network includes a predetermined wireless router and a plurality of wireless routers. The predetermined wireless router has gateway functionality for accessing an external network. Each wireless router of the wireless routers has a single transceiver, and the wireless routers include at least a wireless router which communicates with other wireless router(s) in the wireless network for forwarding network packets by using a single fixed channel and at least a wireless router which communicates with other wireless router(s) in the wireless network for forwarding network packets by using a plurality of channels.

16 Claims, 8 Drawing Sheets

Channel switching schedule of MR_Y :
CH_1 → CH_2 → CH_3 → CH_3 → CH_1 → CH_2 → CH_1 → CH_2 →···
(MR_P) (MR_C1) (MR_C2) (MR_C3) (MR_P)  (MR_C1) (MR_P) (MR_C1)

FIG. 8

WIRELESS NETWORK

CROSS REFERENCE TO RELATED APPLICATIONS

This application claims the benefit of U.S. Provisional Application No. 61/141,246, filed on Dec. 30, 2008 and included herein by reference.

BACKGROUND OF THE INVENTION

1. Field of the Invention

The present invention relates to a wireless communication technology, and more particularly, to a wireless mesh network (WMN) communication technology.

2. Description of the Prior Art

Due to advance of network technique, a variety of wireless networks have been developed to provide better wireless communication quality to end-users. The WMN is one of the emerging next-generation wireless communication technologies, and is capable of offering the required broadband wireless communication environment for areas where wired infrastructure is not available or not worthy to deploy. Moreover, due to WMN's inherent characteristics, such as self-configuring and self-healing capabilities, the WMN can be easily deployed and maintained.

Generally speaking, a WMN consists of a collection of mesh points (i.e., mesh routers), which cooperatively form a multi-hop backbone network. Therefore, the WMN also suffers from some problems, such as throughput, channel switching delay, packet delivery ratio, etc., faced by other multi-hop backbone networks. Therefore, how to effectively solve these problems becomes an important issue to a WMN design.

SUMMARY OF THE INVENTION

It is therefore one of the objectives of the present invention to provides a wireless network including wireless routers each having a single transceiver and using a single fixed channel to communicate with other wireless router(s) for forwarding network packets and wireless routers each having a single transceiver and using a plurality of different channels to communicate with other wireless router(s) for forwarding network packets, to solve the problems mentioned above.

According to an exemplary embodiment of the present invention, a wireless network is disclosed. The exemplary wireless network includes a predetermined wireless router with gateway functionality for accessing an external network, and a plurality of wireless routers each having a single transceiver only. The wireless routers include: at least one wireless router which only uses a single fixed channel to communicate with other wireless router(s) in the wireless network for forwarding network packets; and at least one wireless router which uses a plurality of different channels to communicate with other wireless router(s) in the wireless network for forwarding network packets.

These and other objectives of the present invention will no doubt become obvious to those of ordinary skill in the art after reading the following detailed description of the preferred embodiment that is illustrated in the various figures and drawings.

DETAILED DESCRIPTION

In the exemplary wireless network proposed by the present invention, each of the wireless routers uses a single transceiver, except for a predetermined wireless router (e.g., a wireless router with gateway functionality) due to the consideration of overall hardware cost and network performance. In addition, some of the wireless routers do not switch assigned channels when forwarding the network packets. Please refer to FIG. 1, which is a diagram illustrating a comparison between two channel switching schedules employed by wireless routers each using a single transceiver only. In the sub-diagram (A) of FIG. 1, each of the wireless routers 102, 104, 106, 108, 110, 112 is allowed to use different channels for forwarding network packets in different operational phases, respectively. For example, in the first operational phase S_1, the wireless router 102 uses the second channel CH_2, the wireless routers 104 and 106 use the third channel CH_3, the wireless routers 108 and 110 use the first channel CH_1, and the wireless router 112 uses the second channel CH_2; however, in the second operational phase S_2, the wireless router 102 switches from the second channel CH_2 to the first channel CH_1, the wireless router 104 switches from the third channel CH_3 to the first channel CH_1, the wireless router 106 switches from the third channel CH_3 to the second channel CH_2, the wireless router 108 switches from the first channel CH_1 to the second channel CH_2, the wireless router 110 switches from the first channel CH_1 to the third channel CH_3, and the wireless router 112 switches from the second channel CH_2 to the first channel CH_1.

Figure 1:
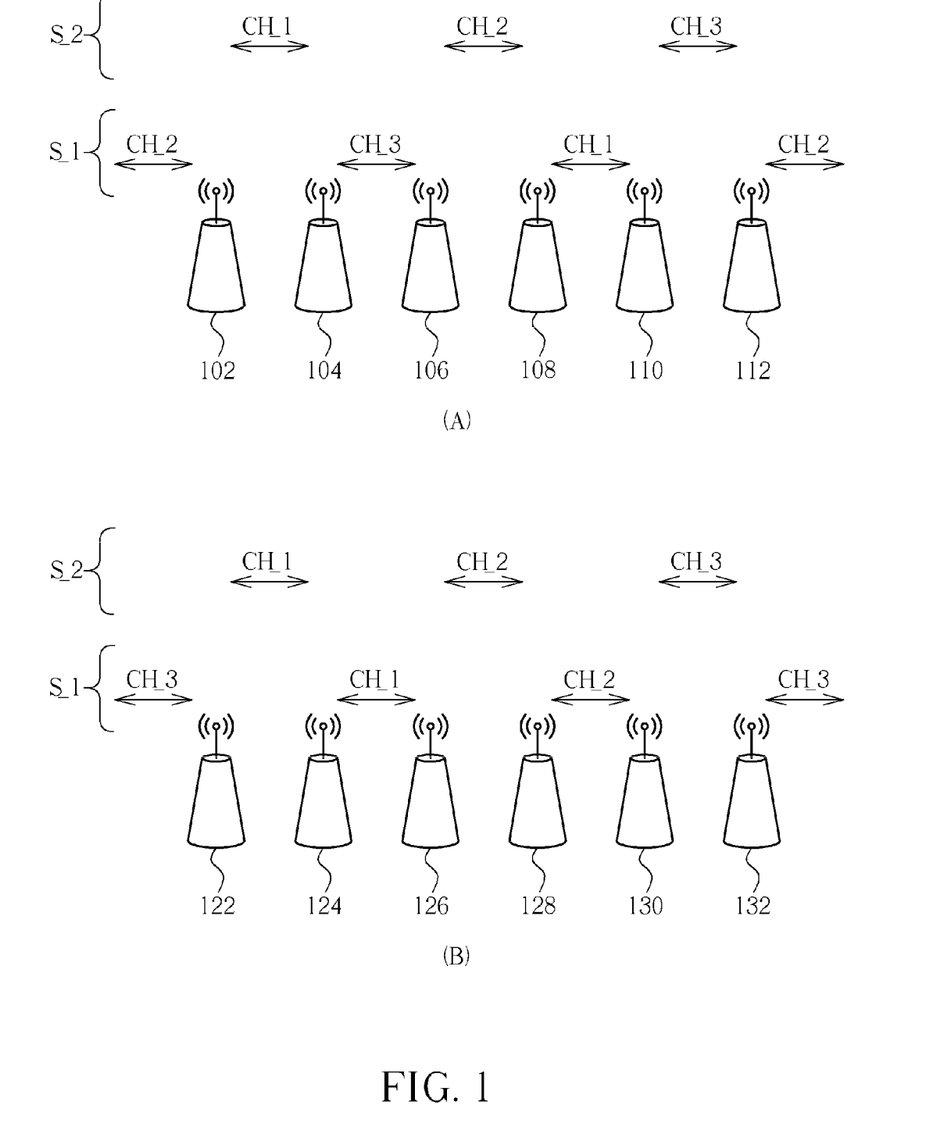
FIG. 1 is a diagram illustrating a comparison between two channel switching schedules employed by wireless routers each using a single transceiver only.

As shown in the figure, due to the repeated channel switching, the wires routers 102-112 can forward network packets from a wireless router positioned at one end to another wireless router positioned at the other end in a pipeline manner. For example, the wireless router 102 receives a network packet via the second channel CH_2 used in the first operational phase S_1, and transmits the received network packet to the wireless router 104 via the first channel CH_1 used in the following second operational phase S_2. Next, the wireless router 104 transmits the network packet received from the wireless router 102 to the wireless router 106 via the third channel CH_3 used in the following operational phase (i.e., the first operational phase S_1). In this way, the received network packet will finally reach the wireless router 112.

As shown in the sub-diagram (B) of FIG. 1, wireless routers 122-132 are categorized into two wireless router types. Each of the first-type wireless routers, such as wireless routers 122, 126 and 130, uses different channels for forwarding network packets in different operational phases, respectively; however, each of the second-type wireless routers, such as wireless routers 124, 128 and 132, uses the same channel for forwarding network packets in different operational phases. For example, in the first operational phase S_1, the wireless router 122 uses the third channel CH_3, the wireless routers 124 and 126 use the first channel CH_1, the wireless routers 128 and 130 use the second channel CH_2, and the wireless router 132 uses the third channel CH_3. However, in the second operational phase S_2, the wireless router 122 switches from the third channel CH_3 to the first channel CH_1, the wireless router 124 keeps using the current first channel CH_1 without performing any channel switching operation, the wireless router 126 switches from the first channel CH_1 to the second channel CH_2, the wireless router 128 keeps using the current second channel CH_2 without performing any channel switching operation, the wireless router 130 switches from the second channel CH_2 to the third channel CH_3, and the wireless router 132 keeps using the current third channel CH_3 without performing any channel switching operation. As shown in the figure, the same objective of transmitting network packets from a wireless router positioned at one end to another wireless router positioned at the other end in a pipeline manner is achieved by the wireless routers 122-132. However, only half of the wireless routers need to repeatedly switch channels in different operational phases, which mitigates the channel switching overhead greatly.

As mentioned above, each of the first-type wireless routers (e.g., wireless routers 122, 126 and 130) will use different channels for forwarding network packets in different operational phases. In above description, as each of the wireless routers 122, 126, 130 is allowed to use two channels, only two operational phases S1 and S_2 are used to control the channel switching operation. However, this is for illustrative purposes only, and is not meant to be a limitation to the present invention.

Based on the structure shown in the sub-diagram (B) of FIG. 1, the present invention therefore proposes an exemplary wireless network which includes wireless routers that do not perform any channel switching operation when forwarding network packets and wireless routers that repeatedly change used channels when forwarding network packets. Please refer to FIG. 2, which is a diagram illustrating a wireless network according to an exemplary embodiment of the present invention. In this embodiment, the wireless network 200 is a tree-based WMN. The exemplary wireless network 200 includes a predetermined wireless router MR_0 with gateway functionality and capable of accessing an external network (e.g., Internet 201). In addition, the wireless network 200 further includes a plurality of wireless routers MR_11-MR_43. In this embodiment, each of the wireless routers MR_11-MR_43 only has a single transceiver. Regarding the predetermined wireless router MR_0 which acts as a gateway, it is equipped with a plurality of transceivers for transmitting and receiving network packets via a plurality of channels due to overall system performance consideration. In this embodiment, the wireless routers MR_11-MR_43 include wireless routers each using one single fixed channel to communicate with other wireless router(s) for forwarding network packets and wireless routers each using a plurality of different channels to communicate with other wireless router(s) for forwarding network packets.

Figure 2:
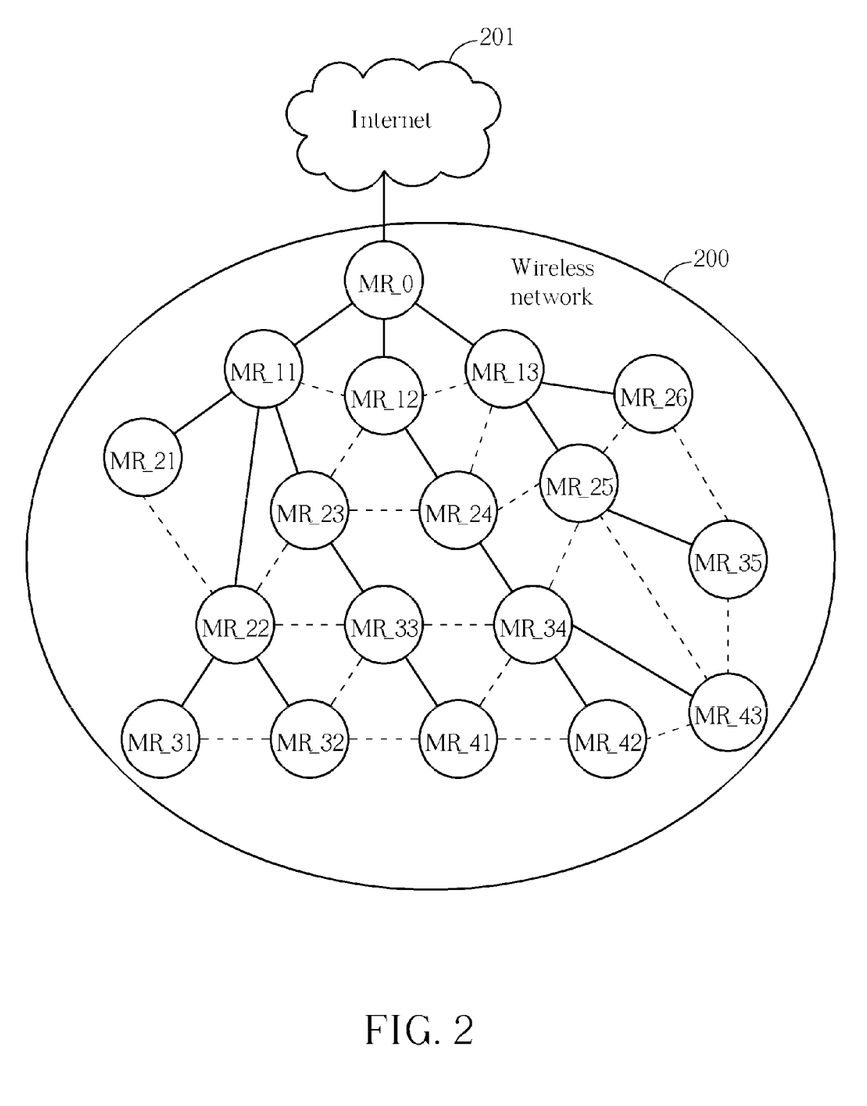
FIG. 2 is a diagram illustrating a wireless network according to an exemplary embodiment of the present invention.

As shown in FIG. 2, the predetermined wireless router MR_0 and other wireless routers MR_11-MR_43 (e.g., WMN's mesh routers) are nodes (e.g., WMN's mesh points) deployed in a tree structure, where the predetermined wireless router MR_0 is a root node of the tree structure. In addition, a solid line connected between two nodes represents a branch of the tree structure, and adjacent wireless routers disposed within a transmission sensing range of each other (i.e., one-hop neighboring wireless routers) are marked by a dotted line. To put it simply, in the tree structure shown in FIG. 2, each node at one predetermined level is one of the wireless routers MR_11-MR_43 that only uses a single fixed channel to communicate with other wireless router(s) for forwarding network packets, and each node at another predetermined level adjacent to the above-mentioned predetermined level is one of the wireless routers MR_11-MR_43 that is allowed to use a plurality of different channels to communicate with other wireless router(s) for forwarding network packets. More specifically, in this embodiment, the predetermined wireless router MR_0 is a level-0 node of the tree structure, each odd-level node of the tree structure is a wireless router (e.g., one of the wireless routers MR_11-MR_13 at level 1 and wireless routers MR_31-MR_35 at level 3) only uses a single fixed channel to communicate with other wireless router(s) for forwarding network packets, and each even-level node of the tree structure is a wireless router (e.g., one of the wireless routers MR_22-MR_25 at level 2) that is allowed to use a plurality of different channels to communicate with other wireless router(s) for forwarding network packets.

In view of above, it can be readily known that each of the wireless routers MR_11-MR_13 and MR_31-MR_35 uses a fixed channel to deal with the network packet forwarding task, and each of the network routers MR_22-MR_25 needs to switch between different channels repeatedly for forwarding network packets. Regarding the wireless routers MR_11-MR_13 and MR_31-MR_35, they are required to be configured by channel assignment. Regarding the network routers MR_22-MR_25, they are required to be configured by channel switching scheduling. In the following, three exemplary channel assignment strategies and two exemplary channel switching scheduling strategies are proposed.

Figure 3:
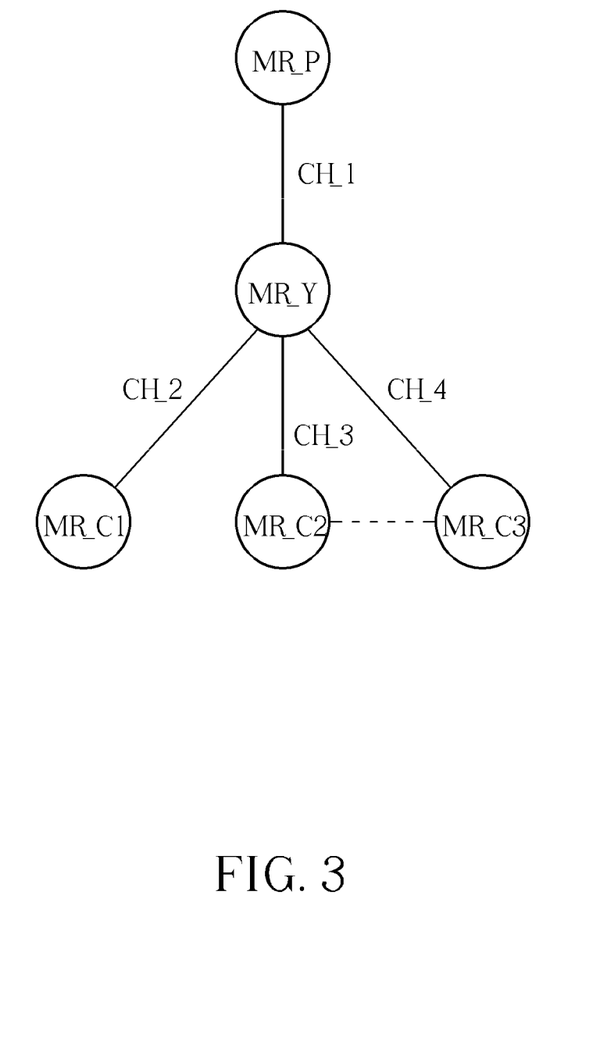
FIG. 3 is a diagram illustrating an exemplary interference-based channel assignment strategy.

Please refer to FIG. 3, which is a diagram illustrating an exemplary interference-based channel assignment strategy. In the figure, each of the wireless routers MR_C1, MR_C2, MR_C3 only has a single transceiver and only uses a single fixed channel to communicate with other wireless receiver(s) for forwarding network packets. In addition, the wireless routers MR_C1, MR_C2, MR_C3 are nodes at the same level (e.g., the same odd level) of the tree structure, and use a plurality of different fixed channels, respectively, to communicate with the same wireless router MR_Y at an upper level (e.g., an even level) of the tree structure for forwarding network packets. By way of example, the wireless routers MR_C1, MR_C2, MR_C3 use the second channel CH_2, the third channel CH_3 and the fourth channel CH_4, respectively. If the upper-level wireless router MR_Y is not a root node of the tree structure, i.e., the wireless router MR_0 shown in FIG. 2, the wireless router MR_Y only has a single transceiver and is allowed to use a plurality of different channels to communicate with other transceiver(s) for forwarding network packets. In addition, the wireless router MR_Y further communicates with the wireless router MR_P at an upper level (e.g., an odd level) for forwarding network packets, where the wireless router MR_P only has a single transceiver and only uses a single fixed channel to communicate with other wireless router(s) for forwarding network packets.

As shown in FIG. 3, the wireless router MR_P is configured to use the first channel CH_1 to communicate with the lower-level wireless router MR_Y. When the channel assignment is applied to the wireless routers MR_C1-MR_C3, the fixed channel used by the wireless router MR_P would be taken into consideration to prevent each of the wireless routers MR_C1-MR_C3 from using a fixed channel identical to that used by the wireless router MR_P, thereby minimizing possible collision. In this embodiment, different fixed channels, such as the second channel CH_2, the third channel CH_3, and the fourth channel CH_4, respectively used by the wireless routers MR_C1-MR_C3 do not include the first channel CH_1 used by the wireless router MR_P.

In the example shown in FIG. 3, the wireless routers MR_C1-MR_C3 at the same level would communicate with the same upper-level wireless router MR_Y for forwarding network packets. If there is only one single wireless router, such as the wireless router MR_C1, communicating with the upper-level wireless router MR_Y for forwarding network packets, and the wireless router MR_P communicates with the lower-level wireless router MR_Y in the same tree structure for forwarding network packets, a channel different from the channel used by the wireless router MR_P is selected from all available channels and then assigned to the single wireless router mentioned above.

Figure 4:
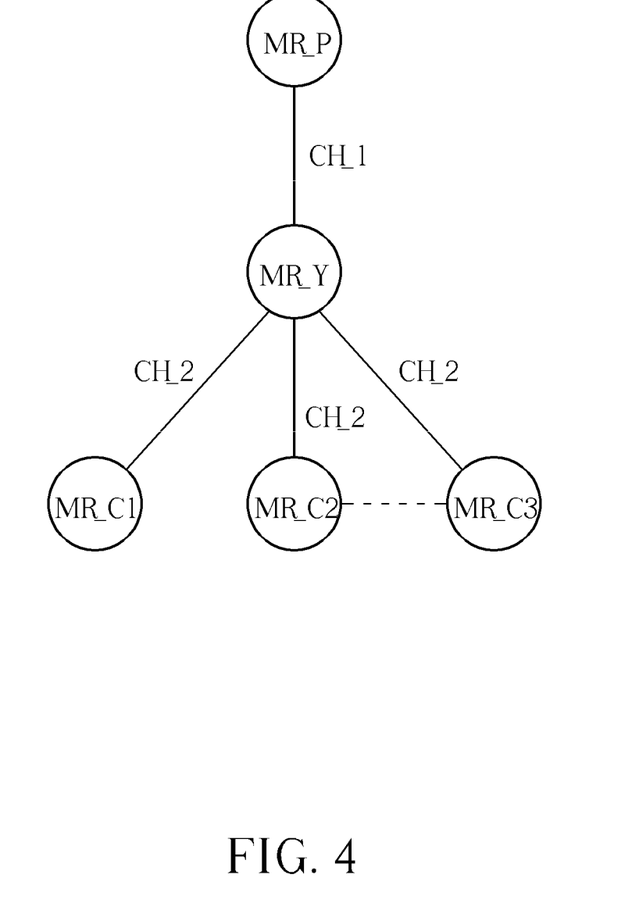
FIG. 4 is a diagram illustrating an exemplary delay-based channel assignment strategy.

The interference-based channel assignment strategy will assign different fixed channels to the wireless routers MR_C1-MR_C3 for mitigating interference therebetween. However, as the upper-level wireless router MR_Y has to switch between different channels, a longer switching delay may occur. Therefore, the present invention further proposes a delay-based channel assignment strategy, as shown in FIG. 4. In the figure, each of the wireless routers MR_C1, MR_C2, MR_C3 only uses a single transceiver and only uses a single fixed channel to communicate with other wireless router(s) for forwarding network packets; in addition, the wireless routers MR_C1, MR_C2, MR_C3 are nodes at the same level (e.g., the same odd level) of the tree structure. Moreover, the wireless routers MR_C1-MR_C3 use the same fixed channel to communicate with the same wireless router MR_Y at an upper level (e.g., an even level) of the tree structure for forwarding network packets. By way of example, the wireless routers MR_C1-MR_C3 all use the second channel CH_2. If the upper-level wireless router MR_Y is not a root node of the tree structure, i.e., the wireless router MR_0 shown in FIG. 2, the wireless router MR_Y only has a single transceiver and is allowed to use a plurality of different channels to communicate with other transceiver(s) for forwarding network packets. In addition, the wireless router MR_Y also communicates with the wireless router MR_P at an upper level (e.g., an odd level) of the tree structure for forwarding network packets, where the wireless router MR_P only has a single transceiver and only uses a single fixed channel to communicate with other wireless router(s) for forwarding network packets.

As shown in FIG. 4, the wireless router MR_P uses the first channel CH_1 to communicate with the lower-level wireless router MR_Y. When the channel assignment is applied to the wireless routers MR_C1, MR_C2, MR_C3, the fixed channel used by the wireless router MR_P would be taken into consideration to prevent each of the wireless routers MR_C1-MR_C3 from using a fixed channel identical to that used by the wireless router MR_P. In this embodiment, the fixed channel, such as the second channel CH_2, used by the wireless routers MR_C1, MR_C2, MR_C3 will be different from the first channel CH_1 used by the wireless router MR_P. In this way, though the wireless router MR_Y only has a single transceiver, it will uses a plurality of different channels (e.g., the first channel CH_1 and the second channel CH_2) to communicate with other wireless routers to serve the request for forwarding network packets.

In the example shown in FIG. 4, the wireless routers MR_C1-MR_C3 at the same level communicate with the same upper-level wireless router MR_Y for forwarding network packets. If there is one single wireless router, such as the wireless router MR_C1, communicating with the upper-level wireless router MR_Y for forwarding network packets, and the wireless router MR_P communicates with the lower-level wireless router MR_Y in the same tree structure for forwarding network packets, a channel different from the channel used by the wireless router MR_P is selected from all available channels and then assigned to the single wireless router.

Figure 5:
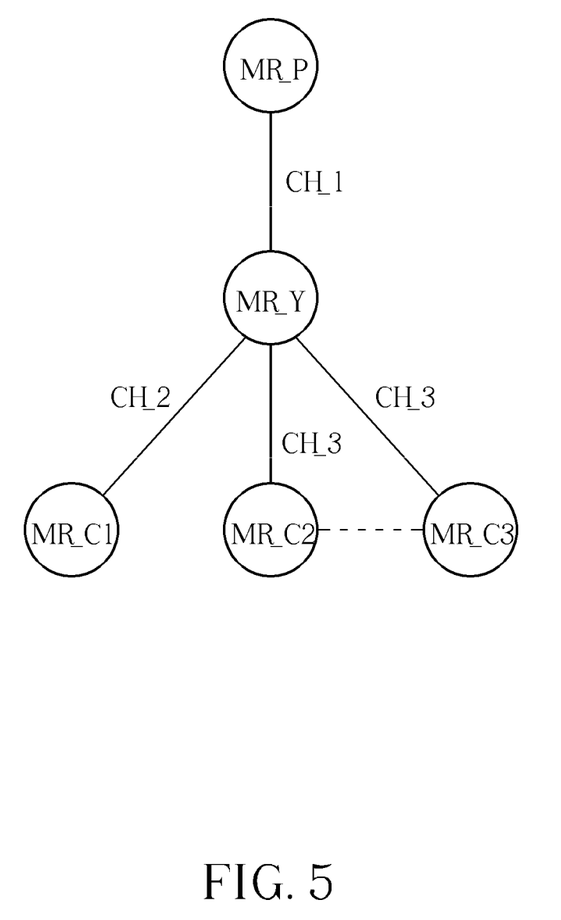
FIG. 5 is a diagram illustrating an exemplary hybrid channel assignment strategy.

The delay-based channel assignment strategy will assign the same fixed channel to all the wireless routers MR_C1-MR_C3 for shortening channel switching delay. However, the interference between neighboring wireless routers at the same level may become significant due to using the same channel. Therefore, to achieve a balance between the channel switching delay and the interference, the present invention further proposes a hybrid channel assignment strategy, as shown in FIG. 5. In the figure, each of the wireless routers MR_C1, MR_C2, MR_C3 only uses a single transceiver and only uses a single fixed channel to communicate with other wireless router(s) for forwarding network packets; in addition, the wireless routers MR_C1, MR_C2, MR_C3 are nodes at the same level (e.g., the same odd level) of the tree structure. Among the wireless routers MR_C1-MR_C3, two wireless routers within a transmission sensing range of each other use the same fixed channel to communicate with the same upper-level wireless router MR_Y for forwarding network packets, and two wireless routers that are not within a transmission sensing range of each other use different fixed channels, respectively, to communicate with the same upper-level wireless router MR_Y for forwarding network packets. In this embodiment, the wireless routers MR_C2 and MR_C3 are within a transmission sensing range of each other, as indicated by the dotted line; in other words, the wireless routers MR_C2 and MR_C3 are one-hop neighboring wireless routers. However, the wireless routers MR_C2 and MR_C3 are two-hop wireless routers, and the wireless routers MR_C1 and MR_C3 are two-hop wireless routers. Though the wireless routers MR_C2 and MR_C3 both use the third channel CH_3 as shown in FIG. 5, each of the wireless routers MR_C2 and MR_C3 can know if there is a wireless router currently using the third channel CH_3 for wireless communication due to the fact that the wireless routers MR_C2 and MR_C3 are within a transmission sensing range of each other. In this way, the interference between the wireless routers MR_C2 and MR_C3 can be avoided. In addition, the wireless router MR_C1 is configured to use a fixed channel (e.g., the second channel CH_2) which is different from the third channel CH_3 used by the wireless routers MR_C2 and MR_C3.

If the upper-level wireless router MR_Y is not a root node of the tree structure, i.e., the wireless router MR_0 shown in FIG. 2, the wireless router MR_Y only has a single transceiver and is allowed to use a plurality of different channels to communicate with other transceivers for forwarding network packets. In addition, the wireless router MR_Y also communicates with the wireless router MR_P at an upper level (e.g., an odd level) of the tree structure for forwarding network packets, where the wireless router MR_P only has a single transceiver and only uses a single fixed channel to communicate with other wireless router(s) for forwarding network packets. As shown in FIG. 5, the wireless router MR_P uses the first channel CH_1 to communicate with the lower-level wireless router MR_Y. When the channel assignment is applied to the wireless routers MR_C1-MR_C3, the fixed channel used by the wireless router MR_P would be taken into consideration to prevent each of the wireless routers MR_C1-MR_C3 from using a fixed channel identical to that used by the wireless router MR_P, thereby reducing the collision. In this embodiment, the fixed channels, such as the second channel CH_2 and the third channel CH_3, used by the wireless routers MR_C1-MR_C3 do not include the first channel CH_1 used by the wireless router MR_P.

In the example shown in FIG. 5, the wireless routers MR_C1-MR_C3 at the same level communicate with the same upper-level wireless router MR_Y for forwarding network packets. If there is one single wireless router, such as the wireless router MR_C1, communicating with the upper-level wireless router MR_Y for forwarding network packets, and the wireless router MR_P communicates with the lower-level wireless router MR_Y in the same tree structure for forwarding network packets, a channel different from the channel used by the wireless router MR_P is selected from all available channels and then assigned to the single wireless router mentioned above.

Regarding the wireless network 200 shown in FIG. 2, it should be noted that it is limited to using only one channel assignment strategy for accomplishing the channel assignment. A combination of the channel assignment strategies can be employed for channel assignment, which also obeys the spirit of the present invention.

After the channel assignment applied to wireless routers each using a single fixed channel to communicate other wireless router(s) for forwarding network packets is accomplished, the wireless routers which need channel switching schedules will be configured according to the channel assignment result. Please refer to FIG. 6, which is a diagram illustrating a ripple channel-switching scheduling strategy. In the figure, each of the wireless routers MR_P and MR_C1-MR_C3 only uses a single transceiver and only uses a single fixed channel to communicate with other wireless router(s) for forwarding network packets, where the wireless routers MR_C1-MR_C3 are nodes at the same level (e.g., the same odd level) of the tree structure, and the wireless router MR_P is a node at another level (e.g., another odd level) of the tree structure. Moreover, the fixed channels used by the wireless routers MR_P and MR_C1-MR_C3 have been assigned by any channel assignment strategy mentioned above. Provided that the aforementioned hybrid channel assignment strategy is employed, the wireless router MR_C1 uses the second channel CH_2 and the wireless routers MR_C2 and MR_C3 both use the third channel CH_3; in addition, each of channels used by the wireless routers MR_C1-MR_C3 is different from the first channel CH_1 used by the wireless router MR_P. Please note that this is for illustrative purposes only, and is not meant to be a limitation of the present invention.

Figure 6:
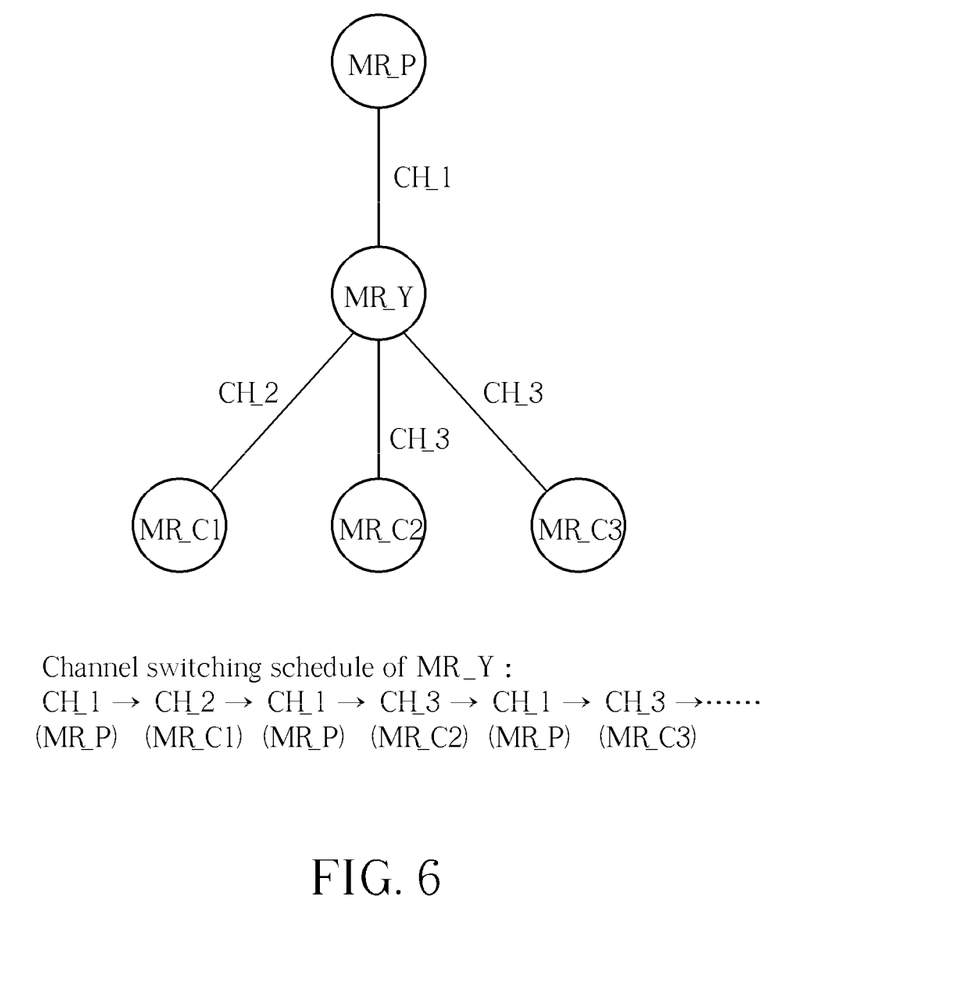
FIG. 6 is a diagram illustrating an exemplary ripple channel-switching scheduling strategy.

In this embodiment, the wireless router MR_Y is allowed to use different channels to communicate with other wireless router(s) for forwarding network packets. When configured using the ripple channel-switching scheduling strategy, the wireless router MR_Y will switch to a channel used by the upper-level wireless router MR_P and a channel used by one selected from the lower-level wireless routers MR_C1-MR_C3, alternately. For example, the wireless router MR_Y sequentially switches to channels used by the wireless routers MR_P, MR_C1, MR_P, MR_C2, MR_P and MR_C3, and then repeatedly performs the same channel switching operation. Therefore, one exemplary channel switching schedule of the wireless router MR_Y is as follows: CH_1→CH_2→CH_1→CH_3→CH_1→CH_3→ . . . . Please note that the channel switching schedule of the wireless router MR_Y is not required to select channels of the lower-level wireless routers MR_C1-MR_C3 in a fixed order (e.g., from left to right). Any channel switching schedule, which configures the wireless router MR_Y to alternately switch to a channel used by the upper-level wireless router MR_P and a channel used by one of the lower-level wireless routers MR_C1-MR_C3, obeys the spirit of the present invention. For example, regarding another exemplary channel switching schedule employed by the wireless router MR_Y, the wireless router MR_Y is configured to sequentially switch to channels of the wireless routers MR_P, MR_C2, MR_P, MR_C3, MR_P and MR_C1, and then repeatedly perform the same channel switching operation.

Figure 7:
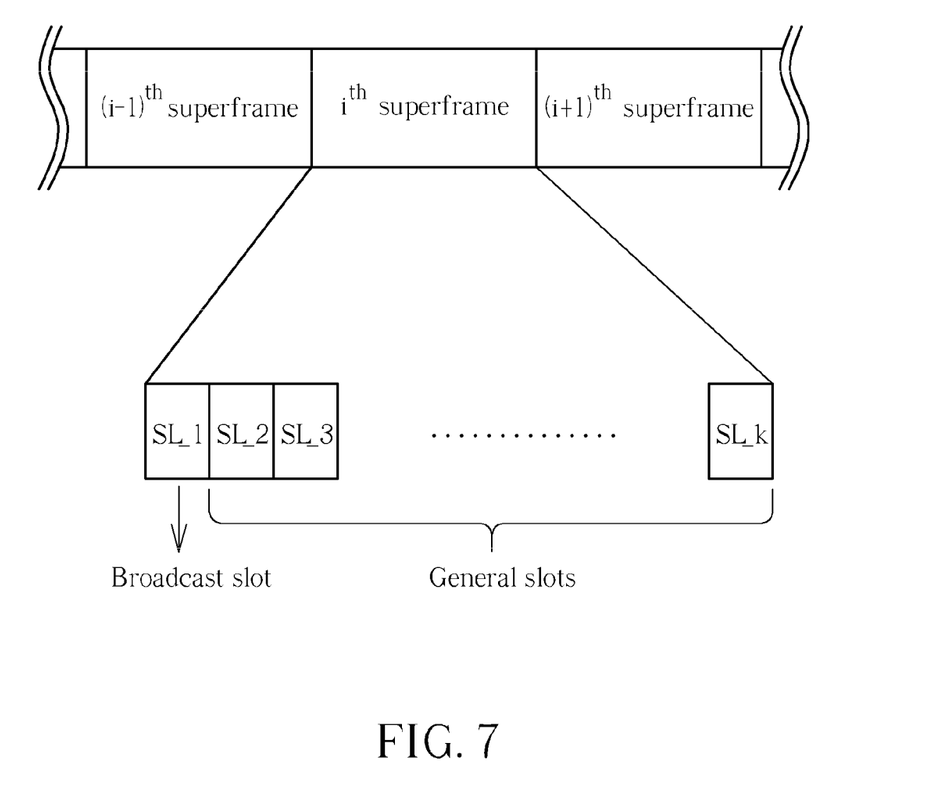
FIG. 7 is a diagram illustrating an exemplary TDMA communication architecture.

In one embodiment of the present invention, the channel switching schedule of the wireless router MR_Y may be based on a time division multiple access (TDMA) communication architecture. As shown in FIG. 7, the communication time is divided into a plurality of equal-length time units. For example, each time unit is a superframe which is further divided into a plurality of slots SL_1-SL_k. In this embodiment, the first slot SL_1 is defined to serve as a broadcast slot, and the remaining slots SL_2-SL_k are defined to serve as general slots. In the broadcast slot, the wireless router MR_Y can broadcast messages to other wireless routers, but is not allowed to perform any network packet forwarding operation. However, in each of the general slots, the wireless router MR_Y is allowed to forward network packets, and follows the above-mentioned channel switching schedule to change its used channel repeatedly. For example, the first channel CH_1 is used in the slot SL_2, the second channel CH_2 is used in the next slot SL_3, and so on. In other words, in the slots SL_2-SL_k of each superframe, the wireless router MR_Y changes its used channel according to the channel switching schedule. In addition, to secure the fair contention for using the channel, a carrier sense multiple access (CSMA) protocol may be adopted in this embodiment to determine which wireless router is allowed to use the channel for transmitting network packets when a plurality of wireless routers are trying to communicate with the wireless router MR_Y through the same channel. However, this is for illustrative purposes only, and is not meant to be a limitation of the present invention.

Furthermore, in one embodiment of the present invention, the locations of the wireless routers are fixed. For example, when deployed to form the wireless network 200 shown in FIG. 2, the wireless routers MR_11-MR_43 are immobile wireless routers. Therefore, when the wireless router deployment in the wireless network 200 is accomplished, the node position (spatial location) of each of the wireless routers MR_11-MR_43 included in the wireless network 200 is fixed. In other words, regarding each wireless router, an upper-level wireless router and a lower-level wireless router thereof can be known. Taking the ripple channel-switching scheduling strategy for example, the wireless router MR_Y simply switches between a channel assigned to its upper-level wireless router MR_P (e.g., an odd-level wireless router) and a channel assigned to one of its lower-level wireless routers MR_C1-MR_C3 (e.g., another odd-level wireless routers). Thus, when the wireless router deployment in the wireless network 200 is accomplished, the channel switching schedule (e.g., CH_1→CH_2→CH_1→CH_3→CH_1→CH_3→ . . . ) used by the wireless router MR_Y is already determined.

However, as mentioned above, the channel switching schedule of the wireless router MR_Y is not required to switch its used channel to channels of the lower-level wireless routers MR_C1-MR_C3 according to a fixed order, such as from left to right. Therefore, assume that the channel switching schedule of the wireless router MR_Y needs adjustment after the wireless router deployment in the wireless network 200 is accomplished. For example, the original channel switching schedule makes the wireless router MR_Y sequentially switch to channels used by wireless routers MR_P, MR_C1, MR_P, MR_C2, MR_P, and MR_C3, and then repeat the same channel switching operation; however, the adjusted channel switching schedule will make the wireless router MR_Y sequentially switch to channels used by wireless routers MR_P, MR_C2, MR_P, MR_C3, MR_P, and MR_C1, and then repeat the same channel switching operation. In this case, the wireless router MR_Y can use the broadcast slot SL_1 to broadcast the adjusted channel switching schedule to its upper-level wireless router MR_P and lower-level wireless routers MR_C1-MR_C3. This alternative design also falls within the scope of the present invention. Please note that all of the wireless routers MR_Y, MR_P and MR_C1-MR_C3 will switch to a default channel in the broadcast slot S_1, thereby allowing the wireless router MR_Y to successfully broadcast the adjusted channel switching schedule to the wireless routers MR_P and MR_C1-MR_C3.

Figure 8:
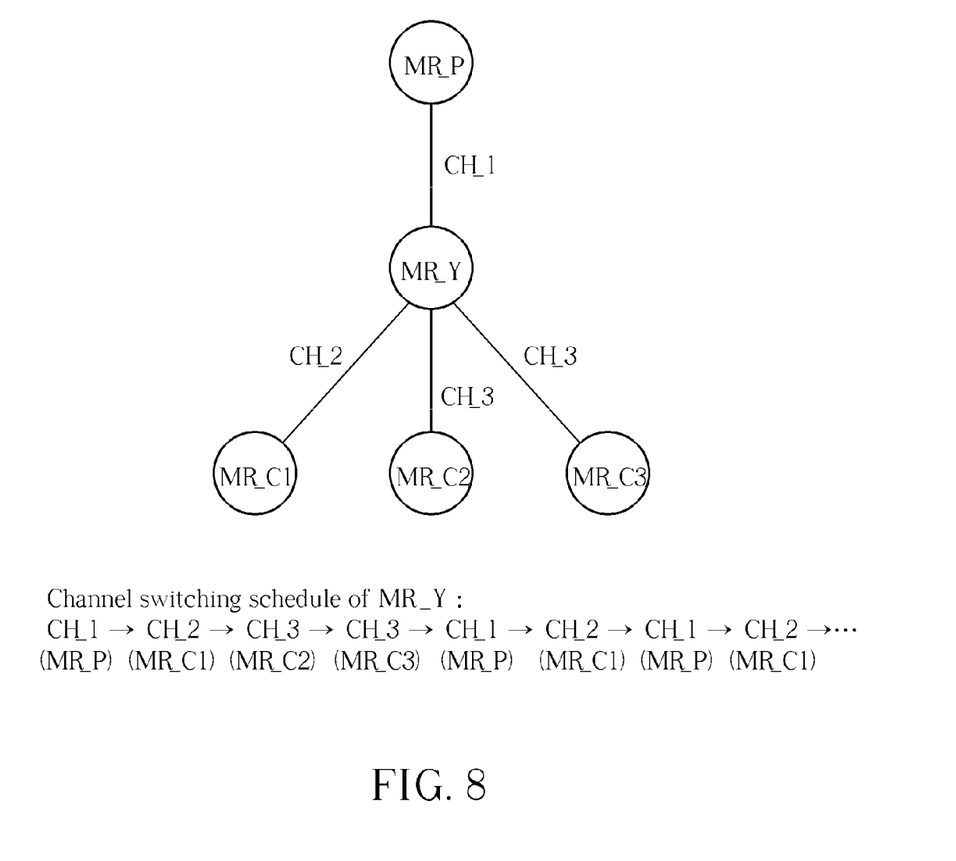
FIG. 8 is a diagram illustrating an exemplary dynamic channel-switching scheduling strategy which is based on the data transmission amount.

As mentioned above, the ripple channel-switching scheduling strategy makes the wireless router MR_Y switch to a channel used by the upper-level wireless router MR_P and a channel used by one of the lower-level routers MR_C1-MR_C3, alternately. That is, in one slot, the wireless router MR_Y switches to the channel of the upper-level wireless router MR_P which is different from channels of the lower-level wireless routers MR_C1-MR_C3; however, in the next slot, the wireless router MR_Y switches to a channel of one of the lower-level wireless routers MR_C1-MR_C3 which is different from that of the upper-level wireless router MR_P. Therefore, the ripple channel-switching scheduling strategy can lower the collision among wireless network nodes. Though the ripple channel-switching scheduling strategy is simple and can be easily implemented, it is less flexible because the actual network traffic variation is not taken into consideration when deciding the channel switching schedule. In view of this, the present invention further proposes a dynamic channel-switching scheduling strategy which is based on the data transmission amount, as shown in FIG. 8. Each of the wireless routers MR_P and MR_C1-MR_C3 only has a single transceiver and only uses a single fixed channel to communicate with other wireless router(s) for forwarding network packets, where the wireless routers MR_C1-MR_C3 are nodes at the same level (e.g., the same odd level) of the tree structure, and the wireless router MR_P is a node at another level (e.g., another odd level) of the tree structure. Moreover, the fixed channels used by the wireless routers MR_P and MR_C1-MR_C3 have been assigned by any channel assignment strategy mentioned above. Provided that the aforementioned hybrid channel assignment strategy is employed, the wireless router MR_C1 uses the second channel CH_2 and the wireless routers MR_C2 and MR_C3 both use the third channel CH_3; in addition, each of channels used by the wireless routers MR_C1-MR_C3 is different from the first channel CH_1 used by the wireless router MR_P. Please note that this is for illustrative purposes only, and is not meant to be a limitation of the present invention.

In this embodiment, the wireless router MR_Y is allowed to use different channels to communicate with other wireless router(s) for forwarding network packets; besides, the channel switching schedule of the wireless router MR_Y is dynamically set according a traffic load (e.g., an amount of data forwarded by network packets) between the wireless router MR_Y and the wireless router MR_P at an upper level (e.g., an odd level) and a traffic load (e.g., an amount of data forwarded by network packets) between the wireless router MR_Y and wireless routers MR_C1-MR_C3 at a lower level (e.g., another odd level).

In one embodiment of the present invention, the channel switching schedule of the wireless router MR_Y is based on a TDMA communication architecture shown in FIG. 7. As the channel switching schedule is dynamically adjusted according to the traffic load, such as the amount of data forwarded by network packets, the wireless routers MR_Y, MR_P, MR_C1-MR_C3 all switch to a default channel in the broadcast slot of each time unit (i.e., each superframe) to allow the wireless router MR_Y to broadcast its current channel switching schedule to wireless routers MR_P and MR_C1-MR_C3. Next, in the following general slots SL_2-SL_k, the wireless router MR_Y will switch to the channel of the upper-level wireless router MR_P and channels of lower-level wireless routers MR_C1-MR_C3 according to the current channel switching schedule. Details of dynamically setting the channel switching schedule according to the data transmission amount are described hereinafter.

Regarding each wireless router y of the wireless network 200, such as the wireless router MR_Y shown in FIG. 8, that needs a channel switching schedule, PC(y) represents a set of upper-level wireless routers (e.g., the wireless router MR_P shown in FIG. 8) associated with the wireless router y and lower-level wireless routers (e.g., the wireless routers MR_C1-MR_C3) associated with the wireless router y in the tree structure of the wireless network 200. Regarding each wireless router z included in the set PC(y), f(y, z, i) represents the traffic load (e.g., the amount of data forwarded by network packets) between the wireless routers y and z in the $i^{th}$ superframe that is estimated by the wireless router y in the $i^{th}$ superframe, and F(y, z, i) represents a weighted traffic load (e.g., a weighted amount of data forwarded by network packets) between the wireless routers y and z from the $1^{st}$ superframe to the $(i-1)^{th}$ superframe that is estimated by the wireless router y in the $i^{th}$ superframe. The relation between f(y, z, i) and F(y, z, i) can be expressed as follows:

$$F(y, z, i) = \begin{cases} \alpha \times f(y, z, i-1) + (1-\alpha) \times F(y, z, i-1), & i > 2 \\ f(y, z, 1), & i = 2 \\ 1, & i = 1, \end{cases} \quad (1)$$

$$\text{where } 0 \le \alpha \le 1$$

Based on the weighted traffic load for each wireless router z included in the set PC(y) and (k−1) general slots SL_2-SL_k in the $i^{th}$ superframe, the number of general slots distributed to each wireless router z is determined. In this way, the time point at which the wireless router MR_Y switches to the channel of the wireless router z is determined. How to determine the number of distributed general slots for each wireless router z is detailed as below.

With regard to each wireless router z included in the set PC(y), at least one general slot is assigned thereto to thereby make the wireless router y switch to a channel of each wireless router z in the $i^{th}$ superframe at least once. The remaining general slots is evenly distributed according to the weighted traffic loads F(y, z, i) of the wireless routers z included in the set PC(y), where the number of the remaining general slot is (k−1)−|PC(y)| if the number of the wireless routers z included in the set PC(y) is |PC(y)|. In this way, the number of general slots finally distributed to each wireless router z can be expressed as follows:

$$\left\lfloor ((k-1) - |PC(y)|) \times \frac{F(y, z, i)}{\sum_{l \in PC(y)} F(y, l, i)} \right\rfloor + 1 \quad (2)$$

It should be noted that $\lfloor \cdot \rfloor$ is a floor function. Therefore, it is possible that there are general slots remaining non-distributed. In one exemplary embodiment, these non-distributed general slots will be distributed to one or more wireless routers z in the set PC(y) according to the actual design consideration. By way of example, a round-robin scheduling scheme is employed to distribute these remaining general slots.

Please note that after the number of slots, included in the (k−1) general slots SL_2-SL_K and distributed to the each wireless router z in the set PC(y), is determined, how to determine the time point at which the wireless router switches to a channel of each wireless router z according to the number of slots distributed to the wireless router z depends upon the actual design consideration. In other words, in accordance with the numbers of general slots distributed to the wireless routers z, the slot positions at which the wireless router y switches to channels of the wireless routers z (i.e., the time points at which the wireless router y switches to channels of the wireless routers z) can be properly adjusted. For example, (k−1) general slots SL_2-SL_k are sequentially and evenly assigned to all wireless routers z in the set PC(y). Taking FIG. 8 for example, provided that most of the network packets forwarded by the wireless router MR_Y are from the wireless router MP_P/MR_C1 to the wireless router MR_C1/MR_P, the weighted traffic loads F(MR_Y, MR_P, i) and F(MR_Y, MR_C1, i) of the wireless routers MR_P and MR_C1 are substantially the same. The channel switching schedule therefore controls the wireless router MR_Y to sequentially switch to channels of the wireless routers MR_P, MR_C1, MR_C2 and MR_C3 in the general slots SL_2-SL_5. In the remaining general slots, the wireless router MR_Y alternately switches to channels of the wireless routers MR_P and MR_C1, as shown in FIG. 8. However, it should be noted that as long as the calculated numbers of distributed general slots are fixed, the wireless router MR_Y is allowed to exchange channels originally used in different general slots according to design requirements.

Please note that above example of calculating the number of slots distributed to each wireless router z included in the set PC(y) is for illustrative purposes only, and is not meant to be a limitation to the present invention. In other words, regarding each target wireless router which needs a channel switching schedule, any means of referring to the traffic loads (e.g., amounts of data forwarded by network packets) between the target wireless router and other target wireless routers to decide the channel switching schedule falls within the scope of the present invention.

In summary, the wireless network disclosed in the embodiment of the present invention has certain advantages/benefits, including improved channel reuse, mitigated collision, simplified channel switching, etc. With regard to the channel reuse issue, only a portion of the wireless routers deployed in the exemplary wireless network of the present invention are assigned with fixed channels; however, in a conventional wireless router, two wireless routers not within a transmission sensing range of each other (i.e., two-hop wireless routers) are not assigned with the same channel, thus resulting in a wasted channel if a wireless router owns the channel without using it (for example, it may switch to another channel to communicate with other wireless routers, and the original channel is idle and not used by any wireless router). With regard to the collision issue, as only the wireless routers at odd levels of the tree structure of the exemplary wireless network use fixed channels, the wireless routers using fixed channels for forwarding network packets are purposely interleaved with other wireless routers in the same wireless network, thereby solving the hidden-terminal problem. Regarding the channel switching issue, in the exemplary wireless network of the present invention, as a wireless router which does not use a single fixed channel for forwarding network packets only communicates with a wireless router which uses a single fixed channel for forwarding network packets, the wireless router which does not use a single fixed channel for forwarding network packets is always capable of switching to a proper channel to communicate with a wireless router which uses a single fixed channel for forwarding network packets, thus significantly simplifying the channel switching design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless network, comprising:
   a predetermined wireless router with gateway functionality, for accessing an external network; and
   a plurality of wireless routers, each having a single transceiver only, the wireless routers comprising:
   at least one wireless router which only uses a single fixed channel to communicate with any other directly upstream and directly downstream devices in the wireless network for forwarding network packets through the at least one wireless router; and
   at least one wireless router which uses a plurality of different channels to communicate with other devices in the wireless network for forwarding network packets.

2. The wireless network of claim 1, wherein the predetermined wireless router and the wireless routers are deployed to form a tree structure, and the predetermined wireless router acts as a root node of the tree structure.

3. The wireless network of claim 2, wherein each node at a predetermined level of the tree structure is a wireless router which uses a single fixed channel to communicate with other wireless router(s) for forwarding network packets; and each node at another predetermined level adjacent to the predetermined level of the tree structure is a wireless router which uses a plurality of different channels to communicate with other wireless router(s) in the wireless network for forwarding network packets.

4. The wireless network of claim 3, wherein the predetermined wireless router is a level-0 node of the tree structure; each odd-level node of the tree structure is a wireless router which uses a single fixed channel to communicate with other wireless router(s) for forwarding network packets; and each even-level node of the tree structure is a wireless router which uses a plurality of different channels to communicate with other wireless router(s) in the wireless network for forwarding network packets.

5. The wireless network of claim 2, wherein the at least one wireless router which only uses the single fixed channel to communicate with other wireless router(s) in the wireless network for forwarding network packets comprises a first wireless router and a second wireless router which are a plurality of nodes at different levels of the tree structure, respectively; the first wireless router and the second wireless router use a first fixed channel and a second fixed channel, respectively, to communicate with a same wireless router in the tree structure for forwarding network packets; and the first fixed channel is different from the second fixed channel.

6. The wireless network of claim 2, wherein the at least one wireless router which only uses the single fixed channel to communicate with other wireless router(s) in the wireless network for forwarding network packets comprises a plurality of first wireless routers and a second wireless router, where the first wireless routers are a plurality of nodes at a same level of the tree structure, respectively; and the at least one wireless router which uses the different channels to communicate with other wireless router(s) in the wireless network for forwarding network packets comprises a third wireless router, where in a plurality of general slots, the third wireless router switches to a channel used by the second wireless router at an upper-level of the tree structure and a channel used by one of the first wireless routers at a lower level of the tree structure, alternately.

7. The wireless network of claim 5, wherein the at least one wireless router which only uses the single fixed channel to communicate with other wireless router(s) in the wireless network for forwarding network packets comprises a plurality of first wireless routers and a second wireless router, where the first wireless routers are a plurality of nodes at a same level of the tree structure, respectively; the at least one wireless router which uses the different channels to communicate with other wireless router(s) in the wireless network for forwarding network packets comprises a third wireless router; the third wireless router determines a channel switching schedule according to a traffic load between the third wireless router and each of the first wireless routers and a traffic load between the third wireless router and the second wireless router; and in a plurality of general slots, the third wireless router alternately switches to a channel used by the second wireless router at an upper level of the tree structure and channels used by the first wireless router at a lower level of the tree structure according to the channel switching schedule.

8. The wireless network of claim 7, wherein each time unit includes a broadcast slot and general slots; and in the broadcast slot of a current time unit, the third wireless router performs following steps:
regarding each wireless router of the first wireless routers and the second wireless router, generating a weighted traffic load by performing a weighted operation upon traffic loads between the wireless router and the third wireless router in time units prior to the current time unit; and
determining the channel switching schedule corresponding to the general slots of the current time unit according to a plurality of weighted traffic loads respectively corresponding to the first wireless routers and the second wireless router.

9. The wireless network of claim 8, wherein when a weighted traffic load between the third wireless router and one wireless router of the first wireless routers and the second wireless router is greater than a weighted traffic load between the third wireless router and another wireless router of the first wireless routers and the second wireless router, a number of general slots in which the third wireless router switches to a channel of the one wireless router of the first wireless routers and the second wireless router is not less than a number of general slots in which the third wireless router switches to a channel of the another wireless router of the first wireless routers and the second wireless router.

10. A wireless network, comprising:
a predetermined wireless router with gateway functionality, for accessing an external network; and
a plurality of wireless routers, each having a single transceiver only and communicating with the external network through the predetermined wireless router, the wireless routers comprising:
a first wireless router which uses a first channel only;
a second wireless router which uses a second channel only; and
a third wireless router which uses at least the first channel and the second channel;
wherein:
in a first operational phase, the first wireless router communicates with the predetermined wireless router via the first channel, and the second wireless router communicates with the third wireless router via the second channel; and
in a second operational phase, the third wireless router communicates with the first wireless router via the first channel.

11. The wireless network of claim 10, being a wireless mesh network (WMN).

12. The wireless network of claim 10, wherein the third wireless router further uses a third channel different from the second channel, and the wireless routers further comprises:
a fourth wireless router which uses the third channel only, wherein in a third operational phase, the third wireless router communicates with the fourth wireless router via the third channel.

13. The wireless network of claim 10, wherein the wireless routers further comprises:
a fourth wireless router which uses the second channel only, wherein in the first operational phase, the fourth wireless router communicates with the third wireless router via the second channel.

14. The wireless network of claim 13, wherein the second wireless router and the fourth wireless router are within a transmission sensing range of each other.

15. The wireless network of claim 10, wherein in a plurality of general slots, the third wireless router switches to the first channel used by the first wireless router and the second channel used by the second wireless router, alternately.

16. The wireless network of claim 10, wherein the third wireless router determines a channel switching schedule according to a traffic load between the third wireless router and the first wireless router and a traffic load between the third wireless router and the second wireless router; and in a plurality of general slots, the third wireless router refers to the channel switching schedule to switch to the first channel used by the first wireless router and the second channel used by the second wireless router, respectively.

* * * * *